| United States Patent [19]
Yamanaka et al.

[11] Patent Number: 5,878,041
[45] Date of Patent: Mar. 2, 1999

[54] ERROR HANDLING IN TRANSMISSION OF DATA THAT CANNOT BE RETRANSMITTED

[75] Inventors: Masayuki Yamanaka; Tetsuo Tachibana; Tatsuru Nakagaki; Kenji Nemoto, all of Kawasaki, Japan

[73] Assignee: Fujitsu Limited, Kanagawa, Japan

[21] Appl. No.: 712,421

[22] Filed: Sep. 11, 1996

[30] Foreign Application Priority Data

Sep. 19, 1995 [JP] Japan .................................. 7-239591

[51] Int. Cl.⁶ ........................................................ H04J 3/14
[52] U.S. Cl. ..................... 370/394; 370/395; 395/182.18
[58] Field of Search .................................. 370/242, 394, 370/395, 505, 506; 395/182.01, 182.18; 348/7, 13

[56] References Cited

U.S. PATENT DOCUMENTS

5,442,400 8/1995 Sun et al. .................................. 348/402
5,566,174 10/1996 Sato et al. .................................. 370/84
5,579,183 11/1996 Van Gestel et al. ....................... 360/48
5,596,581 1/1997 Saeijs et al. ............................. 370/394
5,657,316 8/1997 Nakagaki et al. ....................... 370/394
5,740,173 4/1998 Fiorini ..................................... 370/394

*Primary Examiner*—Min Jung
*Attorney, Agent, or Firm*—Helfgott & Karas, P C.

[57] ABSTRACT

CPCS-UU in the CPCS-PDU trailer defined by the AAL Type 5 in an ATM network is used as a sequence number for error handling. CPCS-UU in the CPCS-PDU trailer is used as a sequence number of an MPEG-2 transport stream packet contained in CPCS-PDU; by monitoring the number of packets, and based on the check results of CRC-32, LI, and cell count, error handling is performed at the receiving end, and for corrupted packets, null packets are inserted in place of the corrupted packets.

12 Claims, 6 Drawing Sheets

ERROR HANDLING IN TRANSMISSION OF DATA THAT CANNOT BE RETRANSMITTED

BACKGROUND OF THE INVENTION

1. Field of the Invention

The present invention relates to an error-handling method used in an asynchronous transfer mode (ATM) network, and more particularly to an error-handling method and apparatus used when transmitting over the ATM adaptation layer (AAL) Type 5 the kind of data that cannot be retransmitted.

2. Description of the Related Art

The AAL Type 5 in B-ISDN (Broadband aspects of Integrated Services Digital Network) protocols is being considered, as a simplified AAL protocol, for application to video on demand (VOD), for example.

If the AAL Type 5 is to be applied for transmission of data, such as video data in VOD, that cannot be retransmitted even if received in error at the receiving end, provisions must be made for reliable error handling.

VOD is considered the most promising section in the multimedia field, and trials of VOD have been started in many parts of the worlds, most notably in North America. However, the work to standardize VOD technology is incomplete. Implementing VOD using ATM networks will require equipment such as video servers, ATM switches, and set top boxes (STBs). Furthermore, in reality, in order to achieve fiber to the curb (FTTC), equipment for implementing asymmetrical digital subscriber line (ADSL) technology as well as multiplexing and other equipment will become necessary.

While it is an essential condition to make the interfaces between these pieces of equipment (protocols at each layer) compatible, the work of standardization is still incomplete. Furthermore, these pieces of equipment are large in scale and technically difficult to develop, and it is not possible for any single company to supply all of the equipment; in fact, this is unrealistic. Therefore, collaboration by a plurality of companies will be needed to construct a system, but this is difficult under the present circumstances for the reason stated above.

In a VOD system using an ATM network, image data is run at a higher layer, above the AAL, and the ATM Forum and other organizations are working vigorously to standardize running image data at the higher layer. For image data, standardization of image compression techniques, such as MPEG-1 and MPEG-2, considering the current transmission limits, has been completed by the Moving Picture Coding Experts Group (MPEG) Standardization Committee. Furthermore, an MPEG system for transmitting MPEG-compressed image data on networks has also been standardized, and currently, a method of transmission on ATM networks is being studied by the ATM Forum among others. More recently, a method of mapping MPEG-2 transport stream packets to the AAL Type 5 has been standardized by the ATM Forum as follows:

(1) For ordinary MPEG-2 transport stream packets, two packets are mapped to the AAL Type 5 PDU (protocol data unit) and segmented into eight cells for transmission. In this case, no stuffing is necessary.

(2) If the header of the first packet contains a program clock reference (PCR) as timing clock information, the packet is immediately mapped to the AAL, Type 5 PDU and segmented into five cells for transmission. In this case, stuffing of 44 bytes becomes necessary.

When transmitting MPEG-2 transport stream packets in ATM cells, a phenomenon, called cell delay variation (CDV) or jitter, will become the most serious problem. A large CDV greatly affects the arrival time of PCR which provides the clock recovery information for synchronizing video and audio. For PCR, not only its value but its arrival time is also important, and the above-described method standardized by the ATM Forum alleviates this problem. Nevertheless, occurrence of CDV is unavoidable because of asynchronous transfers, cell discarding, etc. in the ATM network. Therefore, in order to reproduce video data from the packets transmitted from a video server without degrading quality by suppressing occurrence of CDV, a buffer must be provided in intermediate equipment to adjust the arrival time, and also error control must be performed correctly. In error control, if common part convergence sublayer (CPCS) PDUs where errors occurred are simply discarded, a significant effect will be caused in the arrival time of PCR.

To perform the error control correctly, a sequence number should be provided for each CPCS-PDU, but this function is not provided for the AAL Type 5.

To detect loss of MPEG-2 transport stream packets, the continuity counter contained in the header of each packet should be checked, but this is delegated to the higher layer above the AAL. It is, however, difficult to perform error control correctly at the higher layer. Moreover, checking the continuity counter field will lead to complexity of processing since there are two kinds of CPCS-PDUs as described in the above items (1) and (2). It will also become necessary to check the viability of the continuity counter field itself.

SUMMARY OF THE INVENTION

The present invention is intended to resolve the above-enumerated problems of the prior art, and an object of the invention is to be able to perform error control correctly when the AAL Type 5 is selected in an application where data, if received in error at the receiving end, cannot be retransmitted.

According to the present invention, there is provided an error-handling method comprising the steps of: receiving a data unit in which at least a packet is contained as payload, and to which a sequence number associated with the contained packet is appended; by examining the sequence number appended to the received data unit, detecting loss of a packet that should be extracted from the data unit; and if packet loss is detected, inserting as many null packets as lost packets between packets extracted from data units before and after the data unit.

According to the present invention, there is also provided an error-handling apparatus comprising: a circuit for receiving a data unit in which at least a packet is contained as payload, and to which a sequence number associated with the contained packet is appended; a circuit for, by examining the sequence number appended to the received data unit, detecting loss of a packet that should be extracted from the data unit; and a circuit for, if packet loss is detected, inserting as many null packets as lost packets between packets extracted from data units before and after the data unit.

DESCRIPTION OF THE PREFERRED EMBODIMENTS

Figure 1:
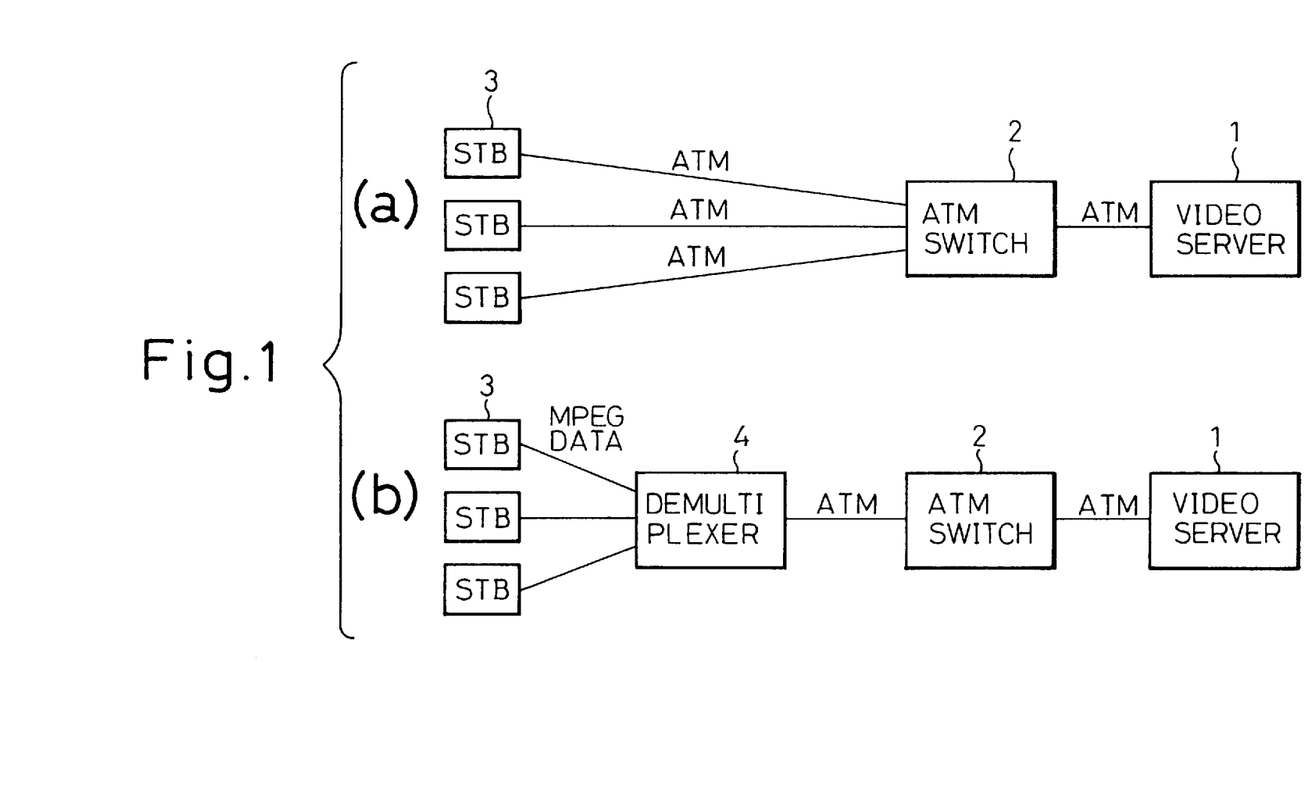
FIG. 1 is a block diagram showing two implementations of VOD using ATM networks.

FIG. 1 shows two implementations, (a) and (b), of VOD using ATM networks.

(a) Transmission from video server 1 to ATM switch 2 and transmission from ATM switch 2 to each STB 3 are implemented by ATM.

(b) Transmission from video server 1 to ATM switch 2 is implemented by ATM, but a demultiplexer 4 is interposed between the ATM switch 2 and the STBs 3 so that ATM data is converted into pure MPEG data for distribution among the STBs 3.

In the system (a), occurrence of CDV is unavoidable in the packets received by each STB 3 because of asynchronous transfers and cell discarding in the ATM network. In the system of (b), in order to prevent the occurrence of CDV, a buffer must be provided in the demultiplexer 4 to adjust arrival times, and also error control must be performed correctly so that packet loss does not occur.

In the present invention, when applying the AAL Type 5 for transmission of data, such as VOD data, that cannot be retransmitted if received in error at the receiving end, CPCS-UU (User-to-User indication) in the CPCS-PDU trailer for the AAL Type 5 is used as the sequence number. In particular, in the case of VOD, the following means are used.

[1] To perform error control correctly while maintaining the packet sending interval from the video server, the AAL Type 5 is provided with the necessary function. More specifically, a sequence number associated with the MPEG-2 transport stream packet is inserted into the CPCS-UU field in the CPCS-PDU trailer for the AAL Type 5. It should be noted here that the sequence number written in the CPCS-UU field is not for the CPCS-PDU itself, but for the packet(s) in the MPEG-2 transport stream; therefore, in the case of the CPCS-PDU containing two packets of type (1) described earlier, the sequence number is incremented by 2 at a time, and in the case of the CPCS-PDU for type (2), the sequence number is incremented by 1 at a time.

[2] By checking the CPCS-UU, the continuity of the MPEG-2 transport stream packets is checked, and a required number of null packets are inserted instead of packets corrupted due to lost cells, bit errors, or erroneously inserted cells.

Figure 2:
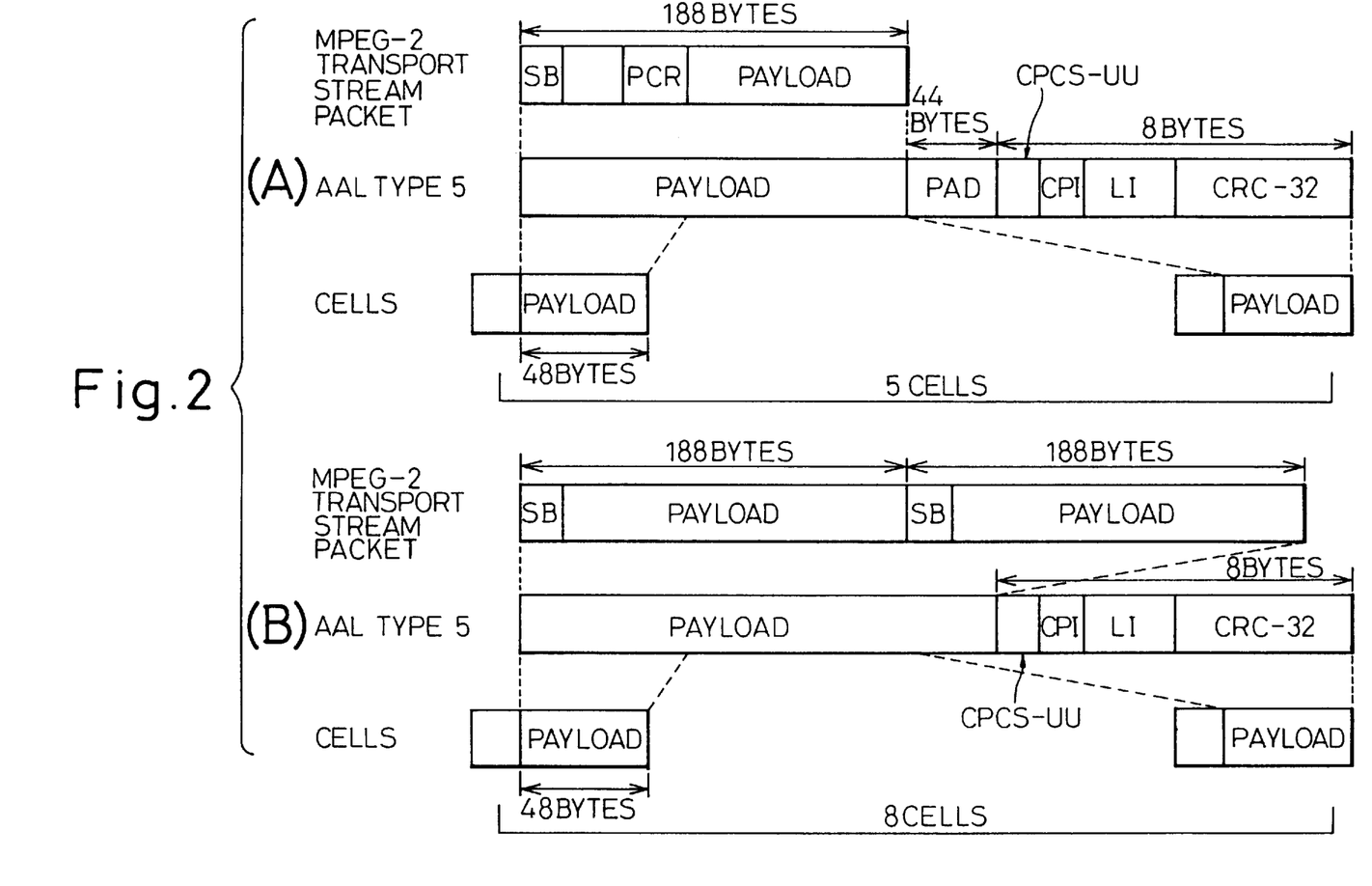
FIG. 2 is a diagram showing how MPEG-2 transport stream packets are mapped to the AAL Type 5.

FIG. 2 shows how MPEG-2 transport stream packets are mapped to the AAL Type 5: (A) concerns packets of type (2) in which one packet containing PCR is processed at a time, and (B) concerns packets of type (1) in which two packets not containing PCR are processed together.

In FIG. 2(A), the MPEG-2 transport stream packet contains a synchronization byte SB, a program clock reference PCR, and data for transmission, PAYLOAD. In the AAL Type 5, a CPCS-PDU is assembled by adding a 44-byte PAD field (consisting of data of all 1s for stuffing) and an 8-byte trailer (consisting of a 1-byte CPCS-UU, a 1-byte common part indicator—CPI, a 2-byte length indicator—LI, and a 4-byte CRC-32 check field) to one MPEG-2 transport stream packet consisting of 188-byte data as payload. The CPCS-PDU is segmented into five ATM cells, each containing a 48-byte payload, for transmission.

In FIG. 2(B), an AAL Type 5 CPCS-PDU is assembled by adding the same 8-byte trailer to the two MPEG-2 transport stream packets (376 bytes). The CPCS-PDU is segmented into eight ATM cells, each containing 48-byte payload, for transmission. In this case, the PAD field is not required.

Figure 3:
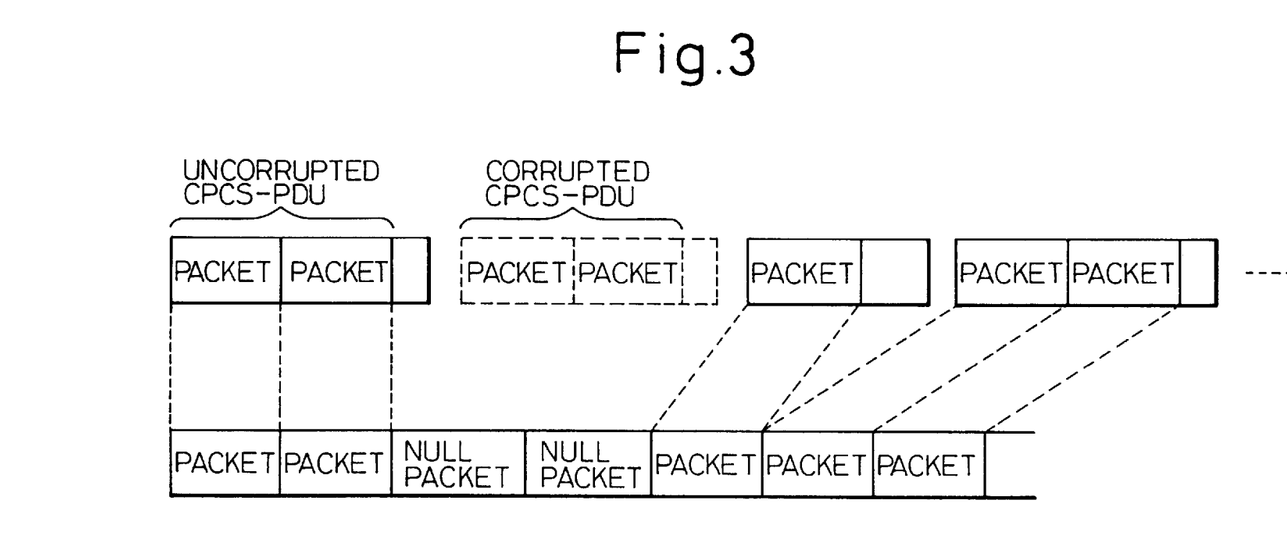
FIG. 3 is a diagram schematically illustrating null packet insertion.

FIG. 3 is a diagram schematically illustrating null packet insertion. As shown, if there is a corrupted CPCS-PDU in an AAL Type 5 signal, a required number of null packets are inserted in place of the corrupted CPCS-PDU to prevent packet loss. Whether the insertion of null packets is necessary or not and how many null packets need to be inserted can be determined by comparing the sequence number increments in successive CPCS-PDUs with the number of packets extracted from the preceding CPCS-PDUs.

Figure 4:
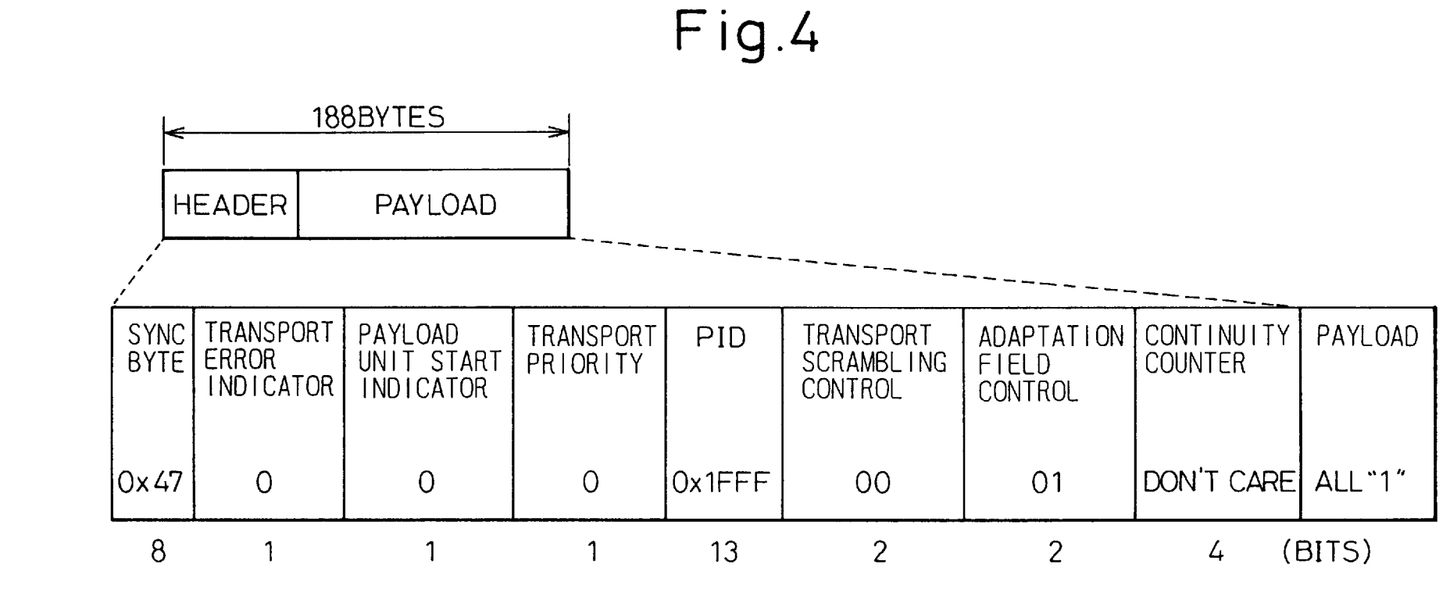
FIG. 4 is a diagram illustrating the structure of a null packet.

FIG. 4 is a diagram illustrating the structure of a null packet; as shown, a packet consisting of 188 bytes is constructed by adding payload consisting of all 1s to a 4-byte header consisting of a synchronization byte (8 bits), transport error indicator (1 bit), payload unit start indicator (1 bit), transport priority (1 bit), packet indication PID (13 bits), transport scrambling control (2 bits), adaptation field control (2 bits), and continuity counter (4 bits).

[3] When a lost cell, bit error, or erroneously inserted cell is detected at the receiving end, the following processing is performed.

Figure 5:
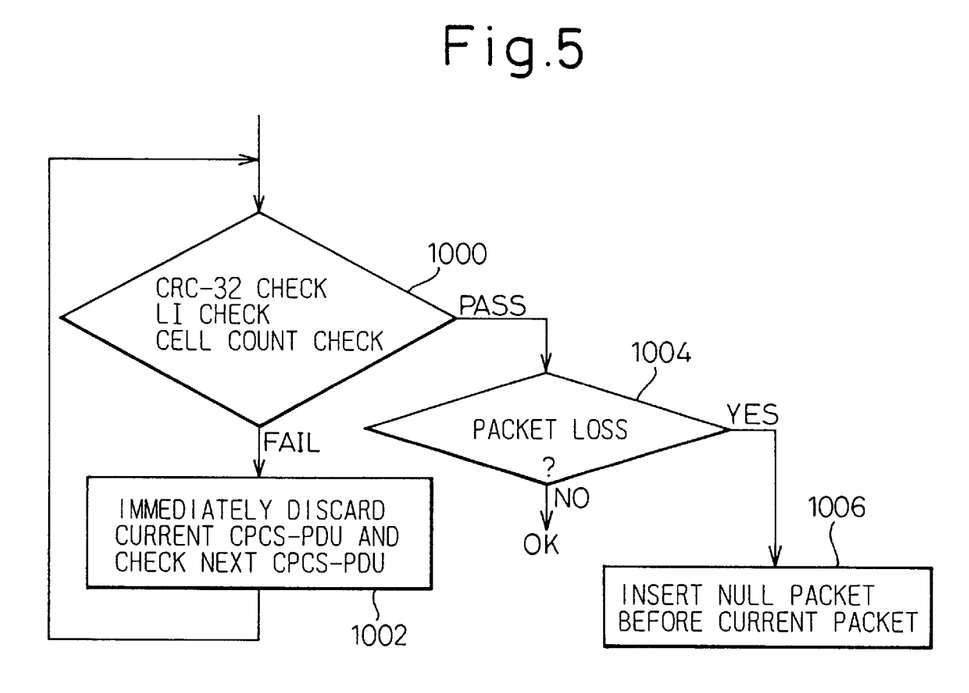
FIG. 5 is a flowchart illustrating an example of error control according to the present invention.

FIG. 5 shows an example of error control, illustrating a simplified procedure in which a CRC-32 check, an LI field check, and a cell count (5 or 8) check are performed.

First, the CRC-32, LI, and cell count are checked on a CPCS-PDU (step 1000), and if any check fails, that is, if the CPCS-PDU is found to be corrupted, then the CPCS-PDU is immediately discarded and the next CPCS-PDU is checked (step 1002). On the other hand, if all checks are found OK, then CPCS-UU is examined to check for packet loss. If there is packet loss, a required number of null packets are inserted before the current packet (step 1006)

Figure 6:
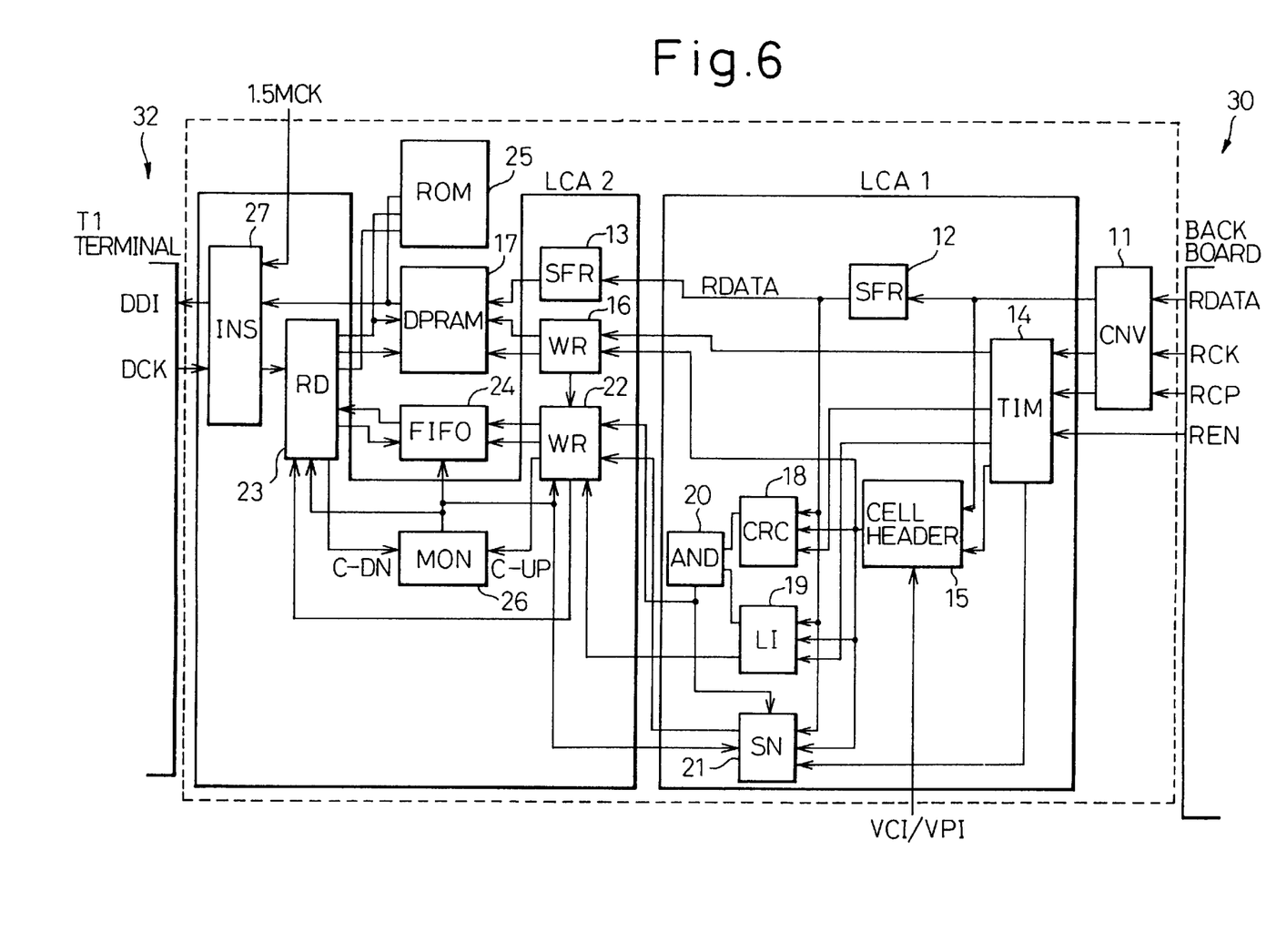
FIG. 6 is a block diagram showing an error-handling apparatus according to the present invention.

FIG. 6 is a block diagram showing an error-handling apparatus, provided for example in the demultiplexer 4 shown in FIG. 1, for performing checks for lost cells, bit errors, and erroneously inserted cells, and for performing processing for null packet insertion, on each CPCS-PDU whose CPCS-PDU trailer contains the CPCS-UU (1 byte) carrying a sequence number associated with an MPEG-2 transport stream packet(s).

In the figure, reference numeral 11 is an 8-to-16 parallel converter for converting 8-bit parallel data to 16-bit parallel data, 12 and 13 are shift registers, 14 is a timing generator for generating timing for the operation of various parts, 15 is a cell header check section for checking payload type identifier (PTI), virtual channel identifier (VCI), and virtual path identifier (VPI) contained in an ATM header, 16 is a first write control section, and 17 is a buffer constructed from a dual-port RAM (DPRAM).

Further, reference numeral 18 is a CRC check section for checking CRC-32, 19 is an LI check section for checking the LI (length identifier) field, 20 is an AND section for performing an AND operation, 21 is an SN check section for checking the sequence number, 22 is a second write control section, 23 is a read control section, 24 is a FIFO (first-in, first-out) memory, 25 is a read-only memory (ROM), 26 is a buffer space monitoring section, and 27 is an F insertion section for inserting a frame bit (F).

The operation of the apparatus of FIG. 6 will be described briefly below.

(1) The CRC-32 check section 18 and the LI check section 19 perform checks for lost cells, bit errors, and erroneously inserted cells, to determine whether the CPCS-PDU, and hence the packet, has been received uncorrupted.

(2) After confirming that the packet has been received uncorrupted, the SN check section 21 examines the sequence number to check for packet loss.

(3) After completing these checks, the packet is written to and read from the buffer 17. If there is packet loss in the CPCS-PDU, a null packet prestored in the ROM 25 is read out instead of reading from the buffer 17.

In FIG. 6, 8-bit parallel data RDATA received from a back board 30 is converted by the 8-to-16 parallel converter 11 into a 16-bit parallel signal, which is fed into the block indicated by LCA1 where the signal is transferred through the shift register 12. Based on the signal fed from the 8-to-16 parallel converter 11, the timing generator 14 generates a timing signal for performing a cell header check and a CPCS-PDU trailer check on a 54-octet cell being transferred 16 bits at a time.

The cell header check section 15 compares the VPI/VCI values in the received cell with the VPI/VCI values set by the CPU, and when they match, creates a valid cell signal indicating the received cell is valid. For the valid cell, the cell header check section 15 checks PTI (AUU), and creates a signal indicating a Beginning Of Message (BOM) cell which constitutes the beginning of a message (CPCS-PDU) or a signal indicating an End Of Message (EOM) cell which constitutes the end of the message.

The CRC check section 18 computes CRC-32 for each CPCS-PDU, and when it checks OK, issues a CRC OK signal.

The LI check section 19 counts valid cells up to the EOM cell, and confirms that the value is 5 or 8. From the EOM cell, the LI check section 19 reads the value of the LI field, and confirms that the value is 188 or 376. When the number of valid cells and the LI field value are 5 and 188 or 8 and 376, it is determined that the CPCS-PDU has been received correctly.

When notified by the output of the AND section 20 that the CRC check is OK and that the LI check result shows correct reception of the CPCS-PDU, the SN check section 21 reads the CPCS-UU field value from the EOM cell and thus confirms the continuity of the MPEG-2 transport stream packet. If any packet is missing, a null packet insertion instruction, with the number of null packets to be inserted, is sent to the write control section 22.

In the block indicated by LCA2, RDATA transferred from LCA1 is latched into the shift register 13, and after removing the cell header and CPCS-PUD trailer from RDATA, only packet data is written to the buffer 17. The write control section 16 generates a write clock and a write address for the data to be written to the buffer 17. Each time data for one packet is written to the buffer 17, the write control section 22 generates a write clock and write data for the FIFO memory 24, and generates a count-up signal C-UP which is supplied to the buffer space monitoring section 26. When there is no null packet insertion instruction from the SN check section 21, the write control section 22 sequentially outputs, as the write data, the start address of each packet stored in the buffer 17; when there is a null packet insertion instruction from the SN check section 21, the write control section 22 outputs, as the write data, a required number of addresses in the ROM 25 where null packet data is stored.

The read control section 23 supplies a read clock to the FIFO memory 24, reads data from the FIFO memory 24, outputs the data as an address in the buffer 17 or ROM 25, and outputs a read enable signal to the buffer 17 and ROM 25 and a count-down C-DN signal to the buffer space monitoring section 26.

The read control section 23 starts its operation when the signal indicating the first cell is input from the write control section 22, and using the data read from the FIFO memory as an address, reads packet data from the buffer 17 or ROM 25.

The buffer space monitoring section 26 generates a reset signal for the write control sections 16 and 22, the read control section 23, and external circuitry, counts the number of data items written in the FIFO memory 24, monitors the number of cells held in the buffer 17 based on the number of cells written to and the number of cells read from the buffer 17, and stops the operation of each section when the buffer space is exhausted. The F insertion section 27 converts the data read by the read control section 23 from a parallel to a serial signal, appends a frame bit F to the output data, and outputs the data at a T1 terminal block 32.

We claim:

1. An error-handling method comprising the steps of:

receiving a data unit in which at least a packet is contained as payload, and to which a sequence number associated with the contained packet is appended;

detecting loss of a packet that should be extracted from the data unit by examining the sequence number appended to the received data unit; and inserting as many null packets as lost packets between packets extracted from data units before and after the data unit when packet loss is detected, wherein the data unit is segmented into a plurality of cells that are asynchronously transferred.

2. A method according to claim 1, wherein the step of detecting packet loss includes the substeps of:

determining whether the data unit has been received correctly; and examining the sequence number only when it is determined that the data unit has been received correctly.

3. A method according to claim 2 wherein the substep of determining whether the data unit has been received correctly includes the substep of determining whether the cells carried in the received data unit have each been received correctly.

4. A method according to claim 1, wherein the step of inserting null packets includes the substeps of:

storing the packet extracted from the received data unit into a buffer; and selecting one of the packet stored in the buffer and a null packet, depending on whether packet loss has been detected or not.

5. A method according to claim 1, wherein the data unit is a CPCS-PDU defined at the ATM Adaptation Layer Type 5, and the sequence number is stored in a CPCS-UU field in the CPCS-PDU.

6. A method according to claim 5, wherein the packet is an MPEG-2 transport stream packet.

7. An error-handling apparatus comprising:

a circuit for receiving a data unit in which at least a packet is contained as payload, and to which a sequence number associated with the contained packet is appended:

a circuit for, by examining the sequence number appended to the received data unit, detecting loss of a packet that should be extracted from the data unit; and a circuit for, when packet loss is detected, inserting as many null packets as lost packets between packets extracted from data units before and after the data unit, wherein the data unit is segmented into a plurality of cells that are asynchronously transferred.

8. An apparatus according to claim 7, wherein the circuit for detecting packet loss includes:

a circuit for determining whether the data unit has been received correctly; and a circuit for examining the sequence number only when it is determined that the data unit has been received correctly.

9. An apparatus according to claim 8, wherein the circuit for determining whether the data unit has been received correctly includes a circuit for determining whether the cells carried in the received data unit have each been received correctly.

10. An apparatus according to claim 7, wherein the circuit for inserting null packets includes:

a buffer for storing the packet extracted from the received data unit; and a circuit for selecting one of the packet stored in the buffer and a null packet, depending on whether packet loss has been detected or not.

11. An apparatus according to claim 7, wherein the data unit is a CPCS-PDU defined at the ATM Adaptation Layer Type 5, and the sequence number is stored in a CPCS-UU field in the CPCS-PDU.

12. An apparatus according to claim 11, wherein the packet is an MPEG-2 transport stream packet.

* * * * *